(12) United States Patent
Heibel et al.

(10) Patent No.: US 11,798,693 B2
(45) Date of Patent: Oct. 24, 2023

(54) MAGNETO-RHEOLOGICAL NUCLEAR REACTIVITY DISTRIBUTION CONTROL ELEMENTS

(71) Applicant: Westinghouse Electric Company LLC, Cranberry Township, PA (US)

(72) Inventors: Michael D. Heibel, Harrison City, PA (US); Richard O. Vollmer, State College, PA (US); Luke D. Czerniak, Mount Pleasant, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 736 days.

(21) Appl. No.: 16/157,414

(22) Filed: Oct. 11, 2018

(65) Prior Publication Data
US 2019/0115113 A1    Apr. 18, 2019

Related U.S. Application Data

(60) Provisional application No. 62/570,787, filed on Oct. 11, 2017.

(51) Int. Cl.
*G21C 7/22* (2006.01)
*G21C 7/24* (2006.01)
*G21C 7/117* (2006.01)

(52) U.S. Cl.
CPC .............. *G21C 7/22* (2013.01); *G21C 7/117* (2013.01); *G21C 7/24* (2013.01)

(58) Field of Classification Search
CPC ... G21C 7/04; G21C 7/06; G21C 7/10; G21C 7/22; G21C 7/24; G21C 7/26; G21C 7/28
(Continued)

(56) References Cited

U.S. PATENT DOCUMENTS

| 3,340,047 A | * | 9/1967 | Persson et al. | ........... G21C 7/24 |
| | | | | 976/DIG. 291 |
| 4,032,401 A | * | 6/1977 | Froelich | ................... G21C 7/06 |
| | | | | 376/398 |

(Continued)

FOREIGN PATENT DOCUMENTS

| EP | 0091029 B1 | 8/1986 |
| EP | 0175975 A2 * | 1/1991 |

(Continued)

OTHER PUBLICATIONS

International Search Report and Written Opinion Issued for PCT/US2018/055345, dated May 24, 2019.

(Continued)

*Primary Examiner* — Sharon M Davis
(74) *Attorney, Agent, or Firm* — K&L Gates LLP

(57) ABSTRACT

A stationary control rod that controls overall nuclear reactivity and axial reactivity distribution of a fuel assembly, such that power level and axial power distribution within the fuel assembly is controlled without the need for movable control rods and associated hardware. The device uses magnetic fields to control the concentration and distribution of a magneto-rheological fluid containing a material with a very high neutron capture cross section, contained in one or more enclosed thimbles placed within existing thimbles in a fuel assembly. The magnetic fields are generated from electricity produced from interactions of the radiation particles within the core, or supplied using electrical cables that attach to fuel assembly top nozzles. The electricity drives a device that encloses associated wire coil assemblies that surround different axial regions of a tube that contains the magneto-rheological fluid.

18 Claims, 8 Drawing Sheets

(58) Field of Classification Search
USPC .......................................................... 376/330
See application file for complete search history.

(56) References Cited

U.S. PATENT DOCUMENTS

| | | | |
|---|---|---|---|
| 4,568,515 A | 2/1986 | Burelbach et al. | |
| 4,728,487 A * | 3/1988 | Cooney | G21C 7/117 376/327 |
| 5,156,804 A * | 10/1992 | Halverson | G21C 7/24 75/238 |
| 8,532,246 B2 | 9/2013 | Pomirleanu | |
| 8,681,920 B2 | 3/2014 | Heibel et al. | |
| 2004/0084263 A1* | 5/2004 | Kintz | H01F 1/447 188/267 |
| 2004/0105980 A1* | 6/2004 | Sudarshan | H01F 1/447 428/404 |
| 2004/0210289 A1* | 10/2004 | Wang | A61K 9/5094 607/116 |
| 2012/0177167 A1* | 7/2012 | Heibel | G21C 17/108 376/255 |
| 2013/0114780 A1 | 5/2013 | Boatwright et al. | |
| 2016/0086680 A1 | 3/2016 | Filler | |
| 2016/0232995 A1* | 8/2016 | Heibel | G21C 7/00 |

FOREIGN PATENT DOCUMENTS

| | | | |
|---|---|---|---|
| JP | S5114088 A | 2/1976 | |
| JP | 2001108780 A | 4/2001 | |
| JP | 2004233210 A | 8/2004 | |
| JP | 2006193686 A * | 7/2006 | ............. H01F 1/447 |
| JP | 2009047700 A | 3/2009 | |
| JP | 2013047633 A | 3/2013 | |
| JP | 2014507642 A | 3/2014 | |
| JP | 2017172684 A | 9/2017 | |
| WO | 2019083734 A2 | 5/2019 | |

OTHER PUBLICATIONS

International Search Report and Written Opinion for International PCT Application No. PCT/US2018/055345, dated May 24, 2019.
Supplementary European Search Report for corresponding European Patent Application No. 18869773.4, dated Jan. 11, 2022.
Multi-mission radioisotope thermoelectric generator, //https://en.wikipedia.org/wiki/Multi-mission_radioisotope_thermoelectric_generator, retrieved Mar. 22, 2022.

* cited by examiner

MAGNETO-RHEOLOGICAL NUCLEAR REACTIVITY DISTRIBUTION CONTROL ELEMENTS

CROSS-REFERENCE TO RELATED APPLICATION

This application claims priority under 35 U.S.C. § 119(e) to U.S. Provisional Patent Application Ser. No. 62/570,787, filed Oct. 11, 2017, entitled "MAGNETO-RHEOLOGICAL NUCLEAR REACTIVITY DISTRIBUTION CONTROL ELEMENTS", which is herein incorporated by reference.

BACKGROUND

1. Field

This invention relates generally to nuclear reactors and more particularly to control rods for nuclear reactors.

2. Related Art

The primary side of nuclear reactor power generating systems which are cooled with water under pressure comprises a closed circuit which is isolated and in heat exchange relationship with a secondary circuit for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump, and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180 degrees in a lower plenum 34, passes upwardly through a lower support plate 37 and a lower core plate 36 upon which the fuel assemblies are seated and through and about the assemblies. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

Rectilinearly movable control rods 28, which typically include a drive shaft 50 and a spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core plate 36 in the core region of the nuclear reactor. In addition to the bottom nozzle 58, the structural skeleton of the fuel assembly 22 also includes a top nozzle 62 at its upper end and a number of guide tubes or thimbles 84 which align with the guide tubes 54 in the upper internals. The guide tubes or thimbles 84 extend longitudinally between the bottom and top nozzles 58 and 62 and at opposite ends are rigidly attached thereto.

The fuel assembly 22 further includes a plurality of transverse grids 64 axially spaced along and mounted to the guide thimbles 84 and an organized array of elongated fuel rods 66 transversely spaced and supported by the grids 64. Also, the assembly 22, as shown in FIG. 3, has an instrumentation tube 68 located in the center thereof that extends between and is captured by the bottom and top nozzles 58 and 62. With such an arrangement of parts, fuel assembly 22 forms an integral unit capable of being conveniently handled without damaging the assembly of parts.

As mentioned above, the fuel rod 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission by-products from entering the coolant and further contaminating the reactor system.

To control the fission process, a number of control rods 78 are reciprocally moveable in the guide thimbles 84 located at predetermined positions in the fuel assembly 22. A rod cluster control mechanism 80 is positioned above the top nozzle 62 and supports a plurality of the control rods 78. The control mechanism has an internally threaded cylindrical hub member 82 with a plurality of radially extending flukes or arms 68 that form the spider 52 previously noted with regard to FIG. 2. Each arm 68 is interconnected to a control rod 78 such that the control rod mechanism 80 is operable to move the control rods vertically in the guide thimbles 84 to thereby control the fission process in the fuel assembly 22, under the motive power of a control rod drive shaft 50 which is coupled to the control rod hub 82, all in a well-known manner.

The mechanical hardware and associated maintenance of the systems used to control the "mechanical reactivity shim" in nuclear reactors represents a very large investment in construction and operating costs. There are huge numbers of negative reactor safety, reliability, and capacity factor events that such mechanical shim systems encounter. It is an object of this invention to provide a means to eliminate or reduce the need for conventional control rods so that the safety (e.g., ejected rod), supply, operating, and maintenance issues associated with mechanical shim systems can be reduced or eliminated.

SUMMARY

The foregoing object is achieved with a nuclear reactor power generation system having a reactor pressure vessel that houses a nuclear core, the nuclear core comprising a plurality of nuclear fuel assemblies respectively having a plurality of elongated fuel rods having an axial length and being maintained in an organized, spaced array by a plurality of axially spaced grids. The grids are supported in tandem by a plurality of thimble tubes interspersed among the fuel rods with the thimble tubes extending between and attached to a top nozzle, positioned above the fuel rods, and a bottom nozzle, positioned below the fuel rods. A stationary control rod is positioned in at least some of the thimble tubes in at least some of the fuel assemblies. The stationary control rods house a magneto-rheological fluid system that comprises a magneto-rheological neutron absorbing fluid. The magneto-rheological fluid system is structured to increase the density or decrease the density of the magneto-rheological fluid at discrete axial locations along the stationary control rod to control an axial and radial power distribution of the nuclear core.

In one embodiment, the magneto-rheological fluid system comprises a sealed inner tube housing the magneto-rheological neutron absorbing fluid with the magneto-rheological neutron absorbing fluid substantially occupying an axial length of the sealed inner tube that extends substantially along an entire length of an active region of the fuel rods. A plurality of magnets are axially spaced in tandem along and supported at discrete positions along the axial length of the sealed inner tube occupied by magneto-rheological neutron absorbing fluid with each of the magnets generating a magnetic field having a variable strength, with an increase in the strength of the magnetic field increasing the density of the magneto-rheological neutron absorbing fluid subject to the magnetic field and a decrease in the strength of the magnetic field decreasing the density of the magneto-rheological neutron absorbing fluid subject to the magnetic field. Preferably, each of the magnets is an electromagnet and in one embodiment each of the magnets has a separate self-powered power source. In one such embodiment, the self-powered power source is configured to be responsive to the radiation surrounding the self-powered power source to produce a current that powers the corresponding electromagnet. Preferably, the strength of the magnetic field increases with an increase in the intensity of the surrounding radiation and the strength of the magnetic field decreases with a decrease in the intensity of the surrounding radiation.

In another embodiment, each of the electromagnets is formed from a corresponding magnetic coil and the relative strength of each of the electromagnets is a product of a number of turns of the corresponding magnetic coil. Preferably, the number of turns of some of the electromagnets along the axial length of the sealed inner tube is different than the number of turns of others of the electromagnets along the axial length of the sealed inner tube to shape an axial power distribution of the corresponding fuel assembly in a preconceived form. Similarly, the number of turns of some of the electromagnets at a same core elevation in a number of the stationary control rods of some of the plurality of nuclear fuel assemblies is different than the number of turns of others of the electromagnets at the same elevation in a number of the stationary control rods of some other of the plurality of nuclear fuel assemblies to shape a radial power distribution at the core elevation in a preselected form.

The liquid component of the magneto-rheological neutron absorbing fluid may comprise Boron-10 ($^{10}$B) or gadolinium and the liquid component may comprise a viscous material that is resistant to radiation induced decomposition such as sodium, lead, or a compound of metals that becomes liquid below reactor operating temperatures. The liquid component may also be organic oils, Nitrate Salts or other molten salts. The strength of a magnetic field of at least some of the electromagnets may also be separately controlled by a controller outside of the reactor pressure vessel.

The invention also contemplates a stationary control rod configured to be inserted into a thimble tube of a nuclear fuel assembly comprising a magneto-rheological fluid system that comprises a magneto-rheological neutron absorbing fluid, the magneto-rheological fluid system being structured to increase the density or decrease the density of the magneto-rheological fluid at discrete axial locations along the stationary control rod to control an axial and radial power distribution of the nuclear core.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

This invention employs magneto-rheological technology, such as a magneto-rheological fluid system, to control the nuclear flux level and profile within the core of a nuclear reactor. As described in U.S. published Patent Application No. 2016/0232995, assigned to the Assignee of this invention, a magneto-rheological fluid has effective density and composition properties that change when a magnetic field is applied across the fluid. According to this invention, a magneto-rheological neutron absorbing fluid includes magnetic particles, a liquid component and neutron absorbing material. The magnetic particles can be micrometer or nanometer scale and in the shape of spheres or ellipsoids. The liquid component may be a viscous material that is resistant to radiation induced decomposition. In certain embodiments, the liquid component includes sodium, lead or a mixture or alloy of metals that becomes liquid below reactor operating temperatures. In other embodiments, the liquid component includes organic oil, nitrate salts or other molten salts. The neutron absorbing material can be selected from Boron-10 ($^{10}$B) and gadolinium.

In a typical magneto-rheological fluid, there are very small ferro-magnetic spheres suspended in some type of viscous oil. The magnetic particles, e.g., micrometer or nanometer scale spheres or ellipsoids, are suspended within the carrier oil, distributed randomly, and in suspension under normal circumstances. When a magnetic field is applied, however, the microscopic particles (usually in the 0.1-10 micrometer range) align themselves along the lines of magnetic flux.

A stationary control rod is positioned in at least some of the thimble tubes in at least some of the fuel assemblies, and houses the magneto-rheological fluid system. The magneto-rheological fluid system is structured to increase or decrease the density of the magneto-rheological neutron absorbing fluid at discrete axial locations along the stationary control rod to control the axial and radial power distribution of the nuclear core.

Figure 1:
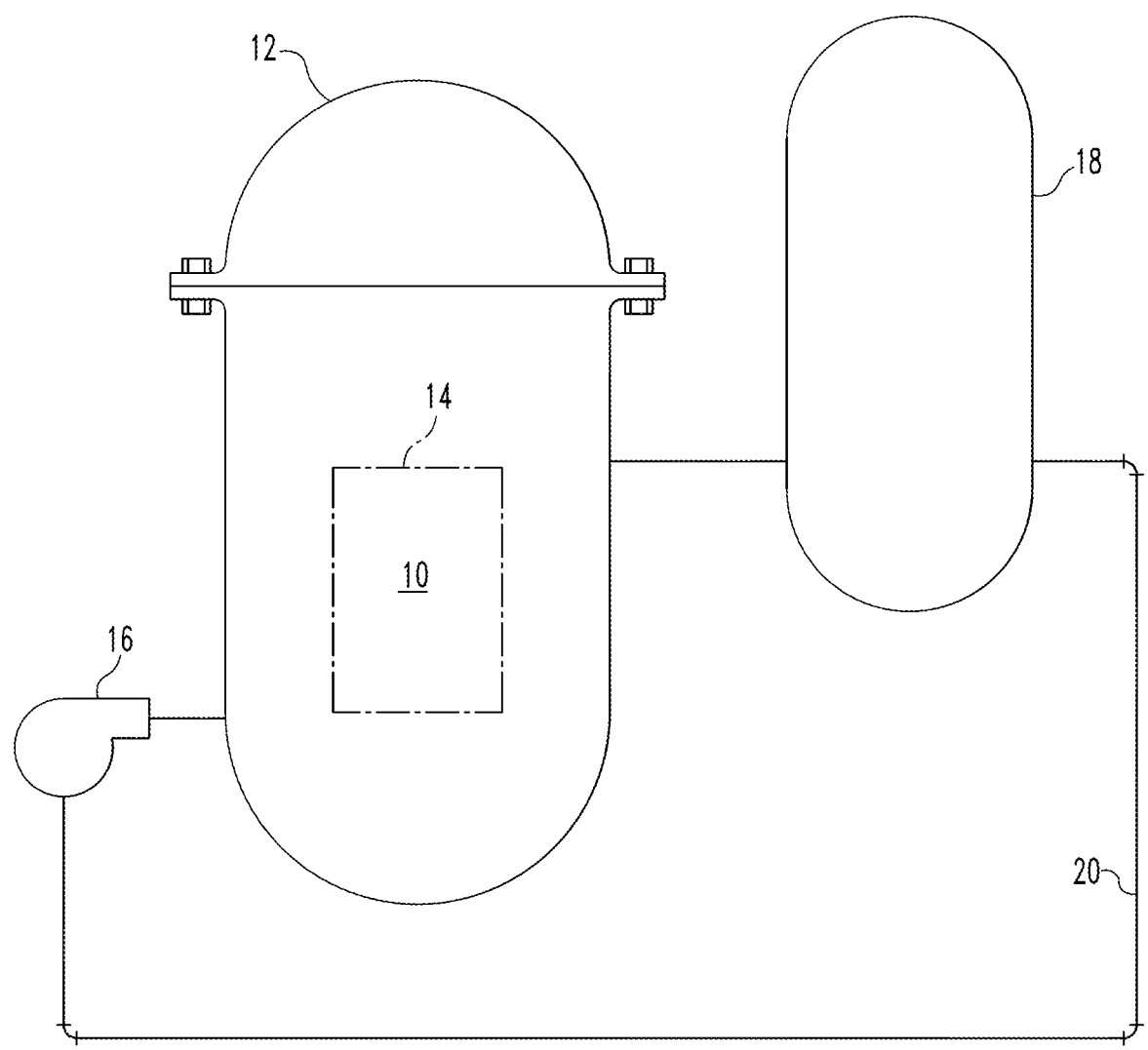
FIG. 1 is a simplified schematic of a nuclear reactor system to which this invention can be applied.
Figure 2:
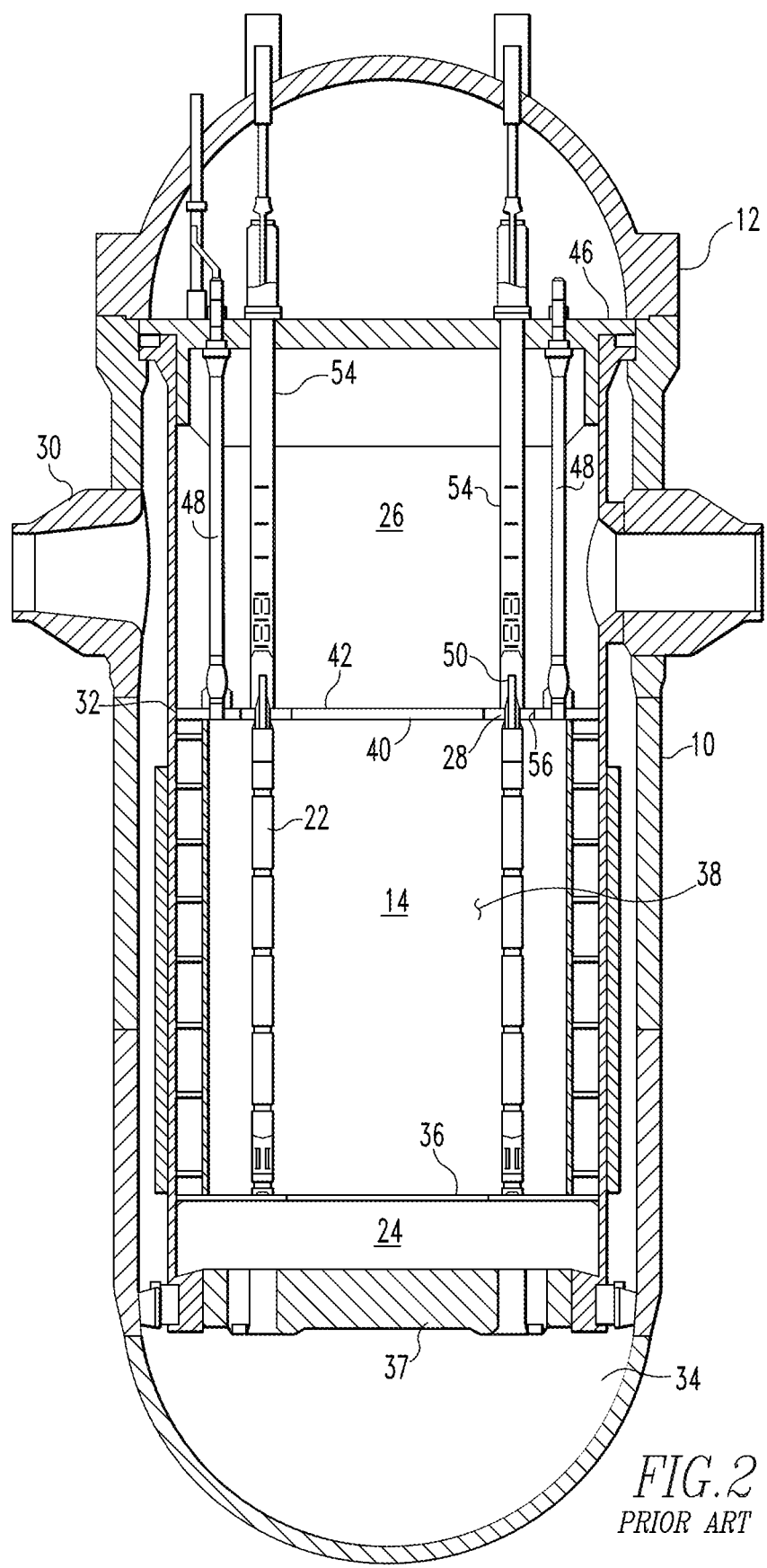
FIG. 2 is an elevational view, partially in section, of a nuclear reactor vessel and internals components to which this invention can be applied.
Figure 3:
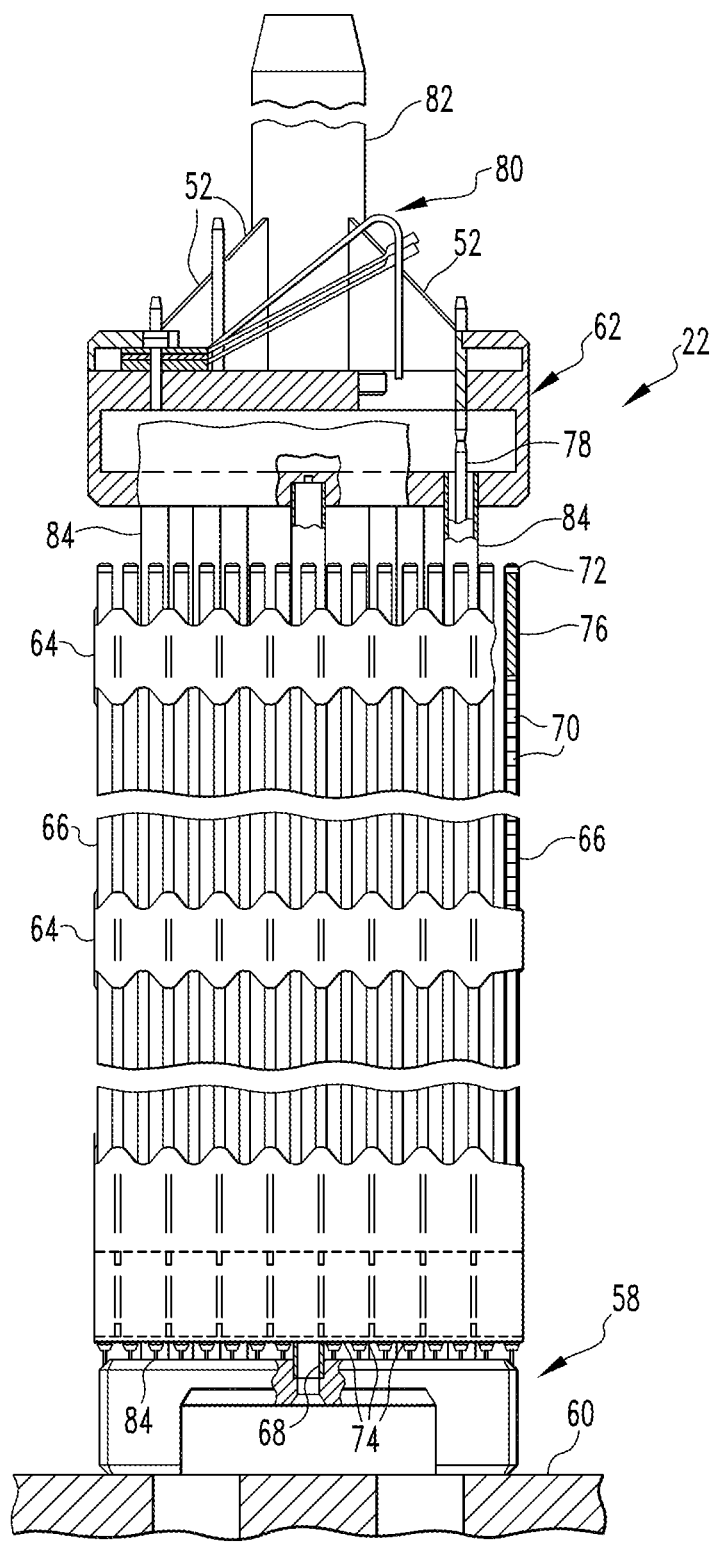
FIG. 3 is an elevational view, partially in section, of a fuel assembly illustrated in vertically shortened form, with parts broken away for clarity.
Figure 4A:
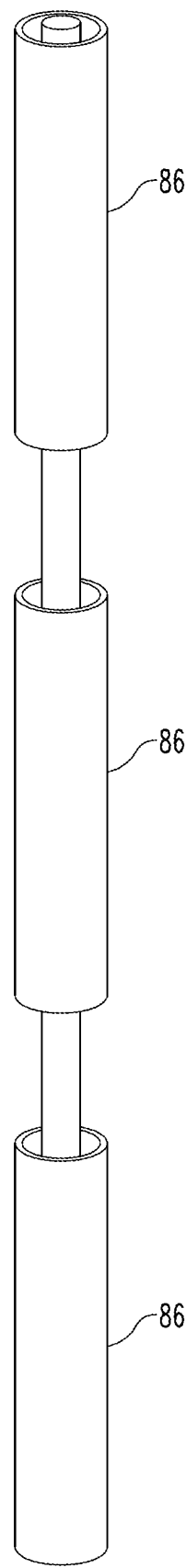
FIGS. 4A, 4B and 4C are schematic representations of a magneto-rheological fluid reactivity device and device insertion apparatus, in accordance with certain embodiments of the invention.
Figure 4B:
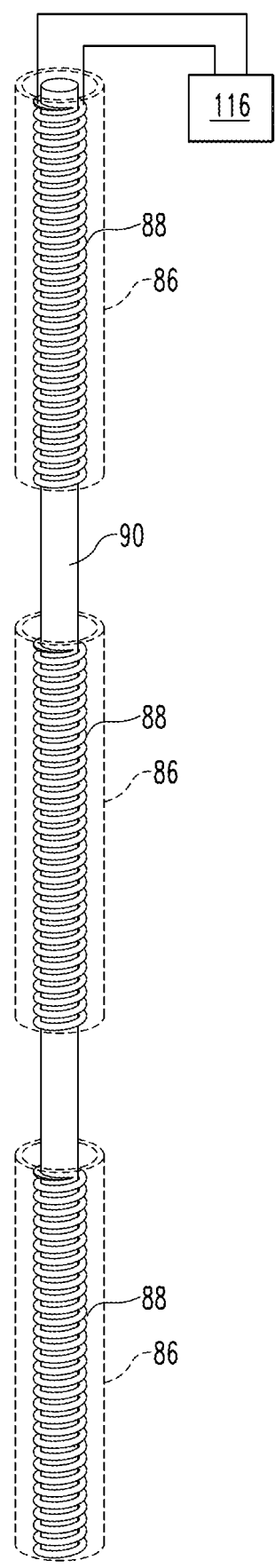
Figure 4C:
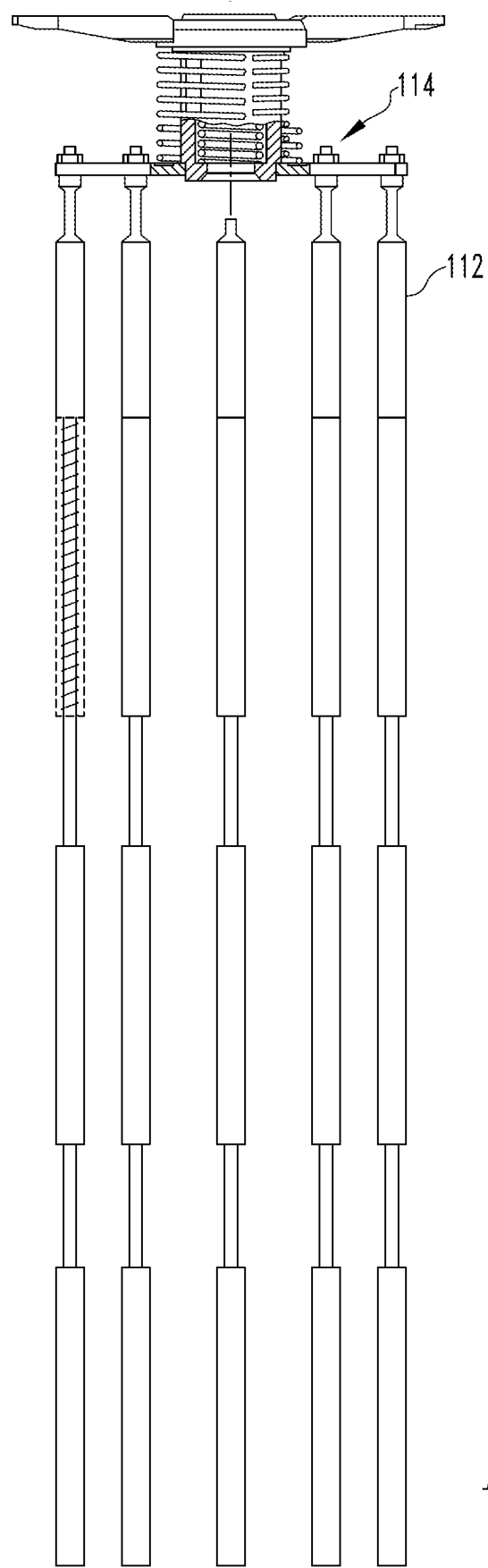
Figure 5:
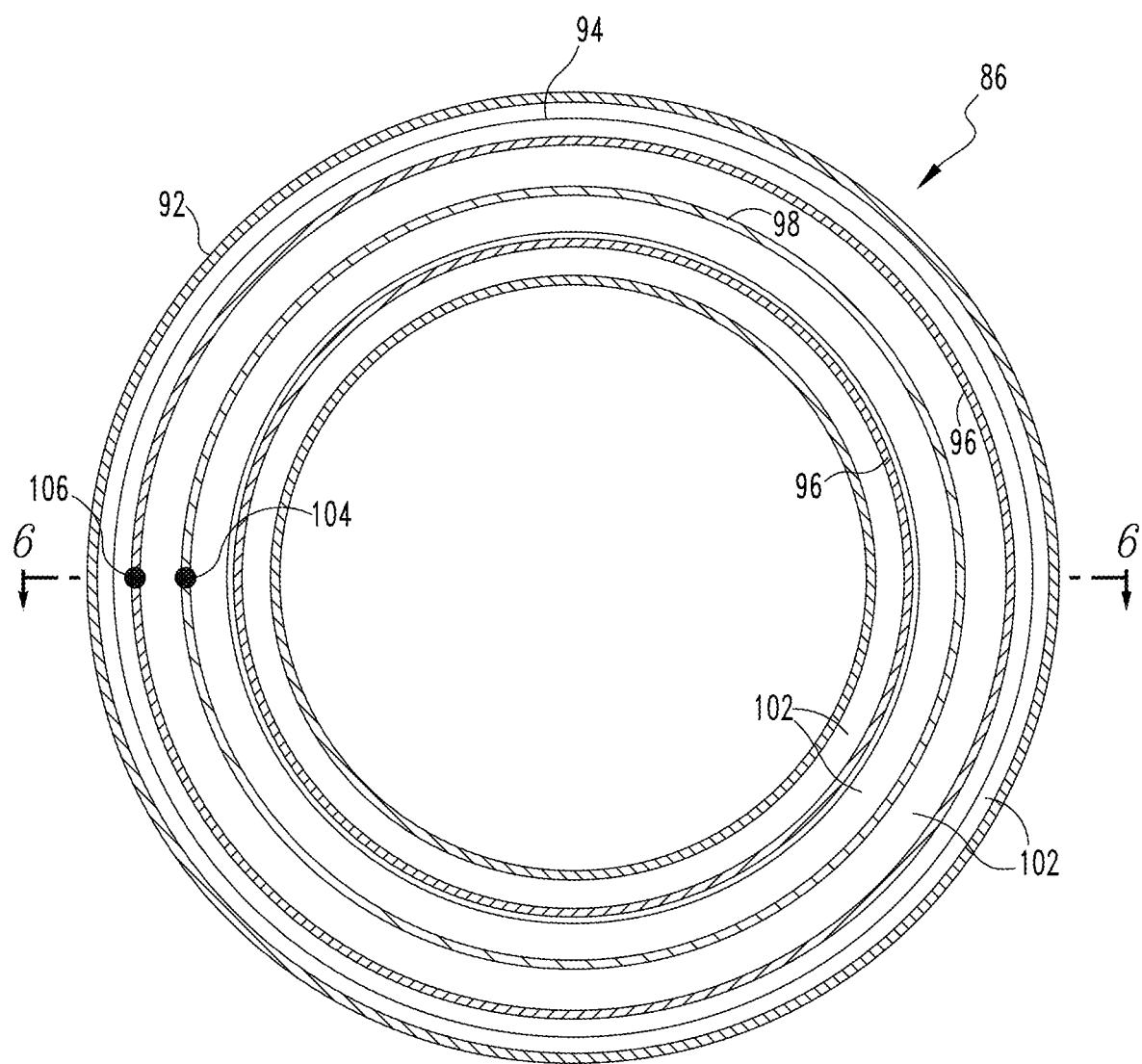
FIG. 5 is a schematic representation of a top view of the cylindrical electric current generator that can be used to supply current to the electromagnetic coils used to adjust the distribution of neutron absorbing particles within the magneto-rheological fluid, in accordance with certain embodiments of the invention.
Figure 6:
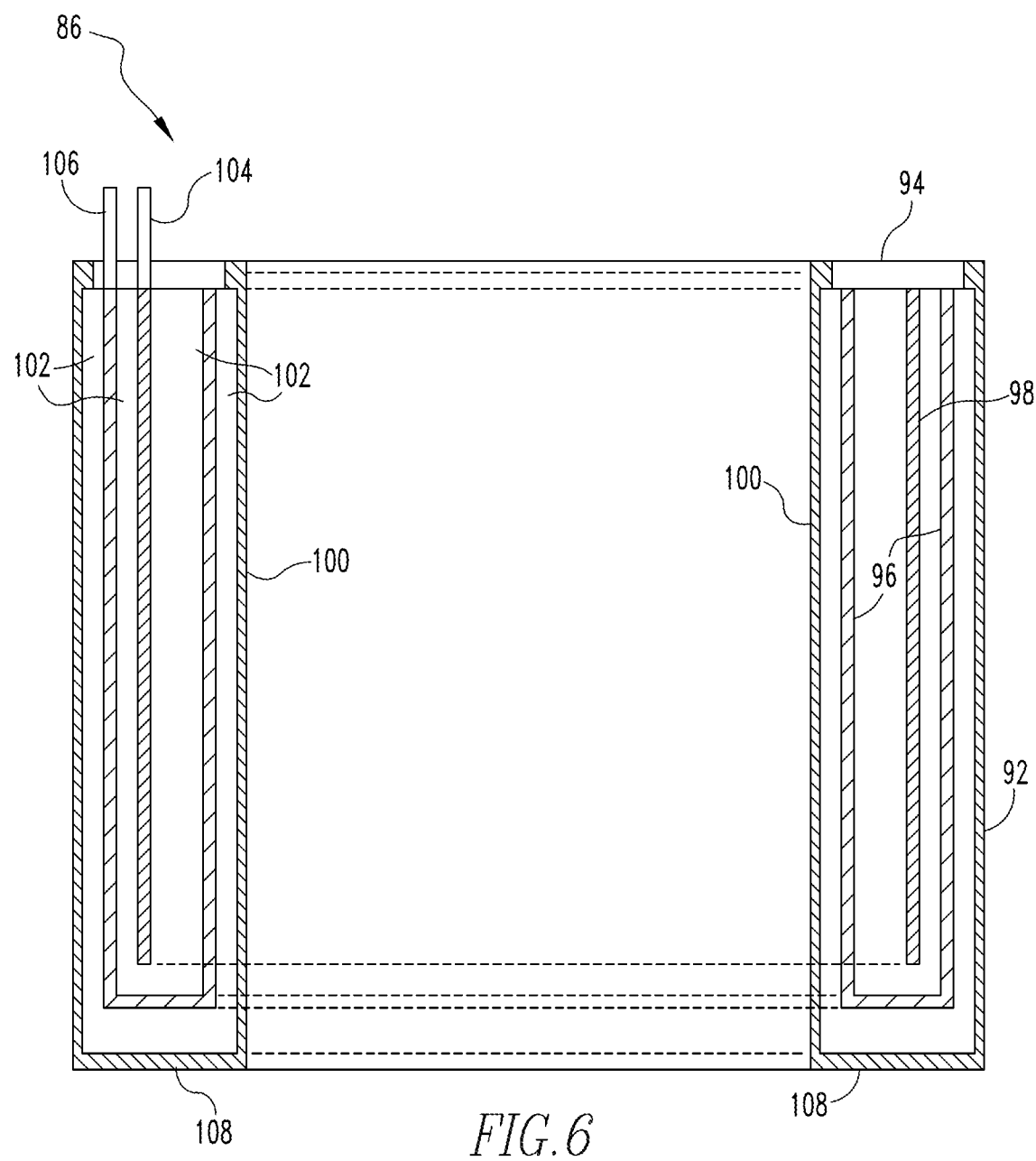
FIG. 6 is a sectional view of the device of FIG. 5, in accordance with certain embodiments of the invention.

Key components of the invention include a power source, a magnet, and the magneto-rheological neutron absorbing fluid. FIGS. 4A, 4B and 4C provide schematic representations of an embodiment of this invention. The key components of the embodiment shown in FIGS. 4A, 4B and 4C are the novel sections of a cylindrical electrical current generator 86, the associated electromagnet coil stack(s) 88, and the magneto-rheological fluid thimble 90. The electrical current generator 86 shown schematically on FIGS. 5 and 6, with FIG. 5 showing a top view and FIG. 6 a cross section taken along the arrows shown in FIG. 5, uses the same principles as a Self-Powered Detector (SPD) that uses the kinetic energy of scattered atomic electrons and other charged particles produced by nuclear reactions to generate a voltage difference between the emitter and the collector of the electrical current generator 86 that can be used to produce an electric current. Such a self-powered detector is more fully described in U.S. Pat. No. 8,681,920 and is assigned to the assignee of this invention. The electrical current generator 86 is formed from a number of concentric cylinders; an outer shell cylindrical ring forms the outer housing wall 92 and encircles two, spaced collector cylindrical rings 96 with a concentric emitter cylindrical ring 98 in between, spaced from the collector rings. The emitter cylindrical ring 98 may be constructed from a primarily gamma-sensitive material like platinum. Optionally, it is also possible to construct the emitter from a neutron sensitive material such as rhodium or a boron ceramic material like boron-carbide or silicon-boride. An inner shell cylindrical ring forms the inner housing wall 100 and electrical insulation 102, such as alumina insulation, is positioned within the housing in the space between each of the cylindrical rings. The cylindrical rings are capped at their lower end by a bottom shell ring 108 and at their top end by a top annular shell ring 94, such as a ceramic insulation ring. The bottom shell ring 108 extends between and is attached to a bottom of the outer shell cylindrical ring and the inner shell cylindrical ring. The top annular shell ring 94 extends between, is attached to, and electrically insulated from a top of the outer shell cylindrical ring and the inner shell cylindrical ring. The outer, inner and bottom housing walls and the collectors can be constructed from steel, zirconium or Inconel. An emitter electrode or pin 104 is electrically connected to the emitter cylindrical ring 98 and extends through, and is insulated from the top annular shell ring 94. A collector electrode or pin 106 is electrically connected to the collector cylindrical rings 96 and extends through, and is insulated from the top annular shell ring 94. Current is drawn between the emitter pin 104 and the collector pin 106. The current from the electrical current generator 86 is inputted to an electromagnet coil stack(s) 88 that produces a magnetic field inside the enclosed thimble 90 containing the magneto-rheological fluid.

The electrical current generator 86 is a self-powered power source for the electromagnet coil stack(s) 88. Each of the electromagnet coil stack(s) 88 can have a separate self-powered power source. The self-powered power source is configured to be responsive to the radiation surrounding it, and to produce a current that powers the corresponding electromagnet coil stack(s) 88.

The thimble 90 has an outer sheath that contains the magneto-rheological fluid. The sheath is a sealed inner tube that houses the magneto-rheological neutron absorbing fluid. The sealed inner tube is constructed using a non-ferromagnetic material, such as zirconium, so the magnetic field intensity inside the magneto-rheological fluid is maximized. The sealed inner tube extends substantially along an entire length of an active region of the fuel rods. The magneto-rheological neutron absorbing fluid substantially occupies an axial length of the sealed inner tube. A plurality of the electromagnet coil stack(s) 88 are axially spaced in tandem, and supported at discrete positions along the axial length of the thimble 90.

Each of the electromagnet coil stack(s) 88 is formed from a corresponding magnetic coil. Each of the electromagnet coil stack(s) 88 generates a magnetic field having a variable strength. Its relative strength is a product of a number of turns of the magnetic coil and the number of turns of some of the electromagnet coil stack(s) 88 at the same core elevation in a number of the stationary control rods of some of the plurality of nuclear fuel assemblies. Preferably, the number of turns of some of the electromagnets along the axial length of the sealed inner tube is different than the number of turns of others of the electromagnets along the axial length of the sealed inner tube to shape an axial power distribution of the corresponding fuel assembly in a preconceived form. Similarly, the number of turns of some of the electromagnets at a same core elevation in a number of the stationary control rods of some of the plurality of nuclear fuel assemblies is different than the number of turns of others of the electromagnets at the same elevation in a number of the stationary control rods of some other of the plurality of nuclear fuel assemblies to shape a radial power distribution at the core elevation in a preselected form.

The strength of the current increases as the reactor power surrounding the electrical current generator 86 increases. This increases the magnetic field strength inside the magneto-rheological neutron absorbing fluid, increasing the density of the magneto-rheological neutron absorbing fluid. The stronger magnetic field produces a higher concentration of iron-boride in the region controlled by the associated electromagnet coil stack(s) 88. Alternatively, the magneto-rheological neutron absorbing material may be composed of a gadolinium compound for use at temperatures below the Curie temperature of gadolinium. The higher concentration of boron-10 ($^{10}B$) or gadolinium that results will serve to depress the surrounding reactor power.

The baseline strength of the current output and the associated magnetic field produced by the electric generator can be controlled by the type and amount of emitter material contained in the generator element and the number of windings used in the electromagnet coil. The liquid component of the magneto-rheological fluid is composed of a viscous material that is resistant to radiation induced decomposition, such as specially prepared organic oils or a compound of metals that become liquids at relatively low temperatures like sodium or lead. Nitrate salts or other molten salts may be suitable.

Figure 7:
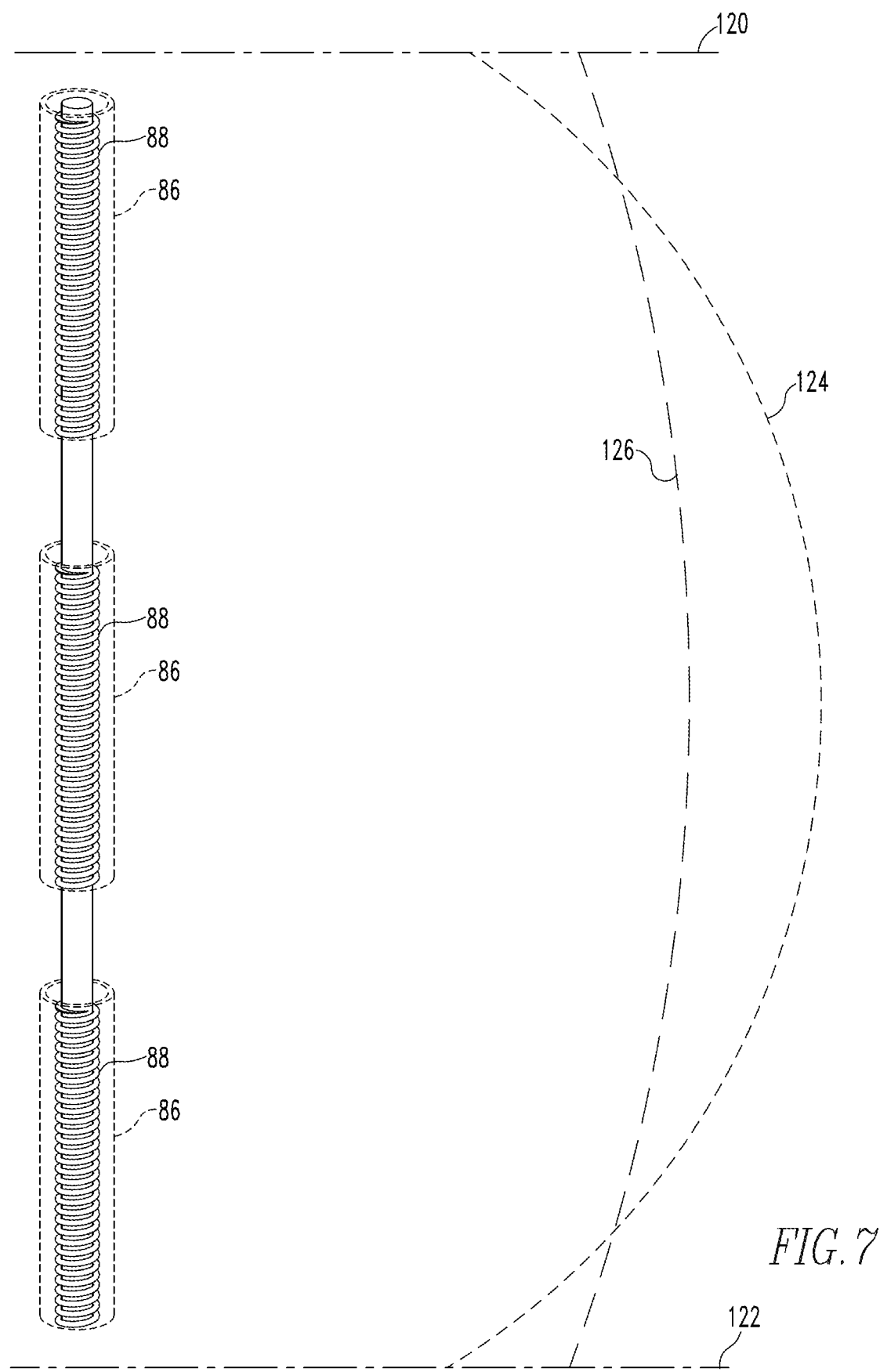
FIG. 7 is a schematic representation of the impact of the magnetic field distribution on axial power shape, in accordance with certain embodiments of the invention.

A number of these elements can be placed in up to all the fuel assemblies in the reactor using existing RCCA (Rod Cluster Control Assembly) rodlet thimbles. FIG. 4C provides an illustration of how the devices could be mounted on a thimble plug 112 or WABA (Wet Annular Burnable Absorber) fixture 114. The polarity of the supplied current can be set prior to use in a fuel assembly, or modified during operation, to achieve magnetic field cancellation or enhancement that will control the axial distribution and density of the neutron absorber in the fluid. The number, wire winding density, and axial distribution of magnetic coil stacks 88 can be set to achieve individual fuel assembly reactivity distribution goals. The electric current strength applied by the current supplies located in the highest relative reactor power regions will increase the boron density at the axial position of the highest relative axial power levels to limit the peak KW/ft. that can be produced in the axially limiting locations in up to all fuel assemblies. FIG. 7 provides an illustration of how the magnetic field strength and alignment can be used to achieve net fuel assembly reactivity and axial reactivity distribution goals. FIG. 7 shows the impact of magnetic field distribution on axial power shape. The top and bottom of active fuel 120 and 122, respectively, are shown as well as the typical axial power distribution 124 and the axial power distribution with middle electromagnet dominant 126. Any global nuclear reactivity control, such as startup and shutdown changes, can be handled by chemical reactivity shim and/or Shutdown Bank operation.

These devices could also utilize external power controls and reactor operator action figuratively illustrated in FIG. 4B by reference character 116, to achieve reactor power distribution and reactor power level control. This approach would require external power attachments to the devices from outside the reactor vessel. The operator or control system may then apply currents that produce the magneto-rheological fluid distribution conditions needed to produce the desired power level and distribution in the reactor. This approach may be used instead of, or in parallel with, the integral electric generators. In certain embodiments, a controller positioned outside of the reactor pressure vessel is used to separately control the strength of a magnetic field of at least some of the electromagnets.

The device described uses magnetic fields produced by power harvested from radiation emitted by the nuclear fuel and/or from an external power supply to control the radial and axial distribution of a neutron absorbing liquid inside the fuel assemblies. This, in turn, controls the reactor power level and power distribution. This essentially eliminates the need for existing mechanical control rods and associated rod control systems.

The successful implementation of the device described in this Specification will allow both operating and next generation plants to significantly reduce or eliminate operating costs associated with control rod usage. Implementation will eliminate a large capital cost associated with construction in new plant designs. Successful implementation will also allow much more efficient fuel utilization by producing a much more even axial burn-up distribution in the fuel assemblies. Implementation of this concept will allow much more efficient load following capability that will allow customers to better control their product revenues.

Furthermore, the electrical current generator 86 described herein has other applications in that, coupled with a source of radiation, it can be employed to power many other devices requiring electricity to operate. Additionally, the electrical current generator 86 can also be used as a self-powered neutron detector.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor power generation system having a reactor pressure vessel that houses a nuclear core, the nuclear core comprising:
   a plurality of nuclear fuel assemblies each respectively comprising:
      a plurality of elongated fuel rods each having an axial length;
      a top nozzle positioned above the plurality of elongated fuel rods;
      a bottom nozzle positioned below the plurality of elongated fuel rods;
      a plurality of axially spaced grids configured to maintain the plurality of elongated fuel rods in an organized, spaced array; and
      a plurality of thimble tubes interspersed among the fuel rods, each of the plurality of thimble tubes extending between and attached to the top nozzle and the bottom nozzle; and
   a stationary control rod positioned in at least one of the plurality of thimble tubes in at least one of the plurality of fuel assemblies, the stationary control rod comprising:
      a magneto-rheological fluid system comprising:
         a sealed tube having an axial length;

a magneto-rheological neutron absorbing fluid occupying the sealed tube, the magneto-rheological neutron absorbing fluid comprising:
a liquid component; and
iron boride; and
magnets axially spaced and supported at discrete positions along the axial length of the sealed tube, wherein each of the magnets are configured to generate a magnetic field having a strength, wherein an increase in the strength of the magnetic field increases the concentration of the iron boride in the magneto-rheological neutron absorbing fluid subject to the magnetic field, and wherein the increase in the concentration of the iron boride in the magneto-rheological neutron absorbing fluid subject to the magnetic field depresses a reactor power surrounding the discrete positions.

2. The nuclear reactor power generation system of claim 1, wherein each of the magnets is an electromagnet.

3. The nuclear reactor power generation system of claim 2, wherein each of the magnets has a separate self-powered power source.

4. The nuclear reactor power generation system of claim 3, wherein the self-powered power source is configured to be responsive to a radiation surrounding the self-powered power source to produce a current that powers the corresponding electromagnet.

5. The nuclear reactor power generation system of claim 4, wherein the strength of the magnetic field increases with an increase in intensity of surrounding radiation, and wherein the strength of the magnetic field decreases with a decrease in intensity of surrounding radiation.

6. The nuclear reactor power generation system of claim 2, wherein each of the electromagnets is formed from a corresponding magnetic coil;
wherein a relative strength of each of the electromagnets is a product of a number of turns of the corresponding magnetic coil; and
wherein the number of turns of some of the electromagnets is different than the number of turns of others of the electromagnets to shape the axial power distribution of the corresponding fuel assembly in a preconceived form.

7. The nuclear reactor power generation system of claim 2, wherein each of the electromagnets is formed from a corresponding magnetic coil;
wherein a relative strength of each of the electromagnets is a product of a number of turns of the corresponding magnetic coil; and
wherein the number of turns of some of the electromagnets at a same core elevation in a number of the stationary control rods of some of the plurality of nuclear fuel assemblies is different than the number of turns of others of the electromagnets at the same elevation in a number of the stationary control rods of some other of the plurality of nuclear fuel assemblies to shape the radial power distribution at the core elevation in a preselected form.

8. The nuclear reactor power generation system of claim 2, wherein the strength of the magnetic field of at least some of the electromagnets are separately controlled by a controller outside of the reactor pressure vessel.

9. The nuclear reactor power generation system of claim 1, wherein the liquid component of the magneto-rheological neutron absorbing fluid comprises a viscous material that is resistant to radiation-induced decomposition.

10. The nuclear reactor power generation system of claim 9, wherein the liquid component of the magneto-rheological neutron absorbing fluid comprises sodium, lead or a mixture or alloy of metals that becomes liquid below reactor operating temperatures.

11. The nuclear reactor power generation system of claim 9, wherein the liquid component of the magneto-rheological neutron absorbing fluid comprises organic oils, nitrate salts or other molten salts.

12. A stationary control rod configured to be inserted into a thimble tube of a nuclear fuel assembly having a plurality of elongated fuel rods, the stationary control rod comprising:
a sealed tube having an axial length;
a magneto-rheological neutron absorbing fluid occupying the sealed tube, the magneto-rheological neutron absorbing fluid comprising:
a liquid component; and
magnetic particles comprising
a neutron absorbing material; and
a plurality of magnets axially spaced and supported at discrete positions along the axial length of the sealed tube, wherein each of the magnets are configured to generate a magnetic field having a strength, wherein an increase in the strength of the magnetic field increases the concentration of the neutron absorbing material in the magneto-rheological neutron absorbing fluid subject to the magnetic field, and wherein the increase in the concentration of the neutron absorbing material in the magneto-rheological neutron absorbing fluid subject to the magnetic field depresses a reactor power surrounding the discrete positions.

13. The stationary control rod of claim 12, wherein each of the magnets is an electromagnet.

14. A stationary control rod of claim 12, wherein the neutron absorbing material comprises boron-10 or gadolinium.

15. The nuclear reactor power generation system of claim 12, wherein the liquid component of the magneto-rheological neutron absorbing fluid comprises a viscous material that is resistant to radiation-induced decomposition.

16. The nuclear reactor power generation system of claim 12, wherein the liquid component of the magneto-rheological neutron absorbing fluid comprises sodium, lead or a mixture or alloy of metals that becomes liquid below reactor operating temperatures.

17. The nuclear reactor power generation system of claim 12, wherein the liquid component of the magneto-rheological neutron absorbing fluid comprises organic oils, nitrate salts or other molten salts.

18. A stationary control rod configured to be inserted into a thimble tube of a nuclear fuel assembly having a plurality of elongated fuel rods, the stationary control rod comprising:
a sealed tube having an axial length;
a magneto-rheological neutron absorbing fluid occupying the sealed tube, the magneto-rheological neutron absorbing fluid comprising:
a liquid component; and
magnetic particles comprising
boron; and
magnets located at positions along the axial length of the sealed tube, wherein each of the magnets are configured to generate a magnetic field having a strength, wherein an increase in the strength of the magnetic field increases a density of the boron in the magnetic-rheological neutron absorbing fluid at the positions along the length of the sealed tube, and wherein the increase in the density of the boron in the magnetic-rheological neutron absorbing fluid at the positions along the length of the sealed tube depresses a reactor power surrounding the positions along the length of the sealed tube.

* * * * *